UNITED STATES PATENT OFFICE.

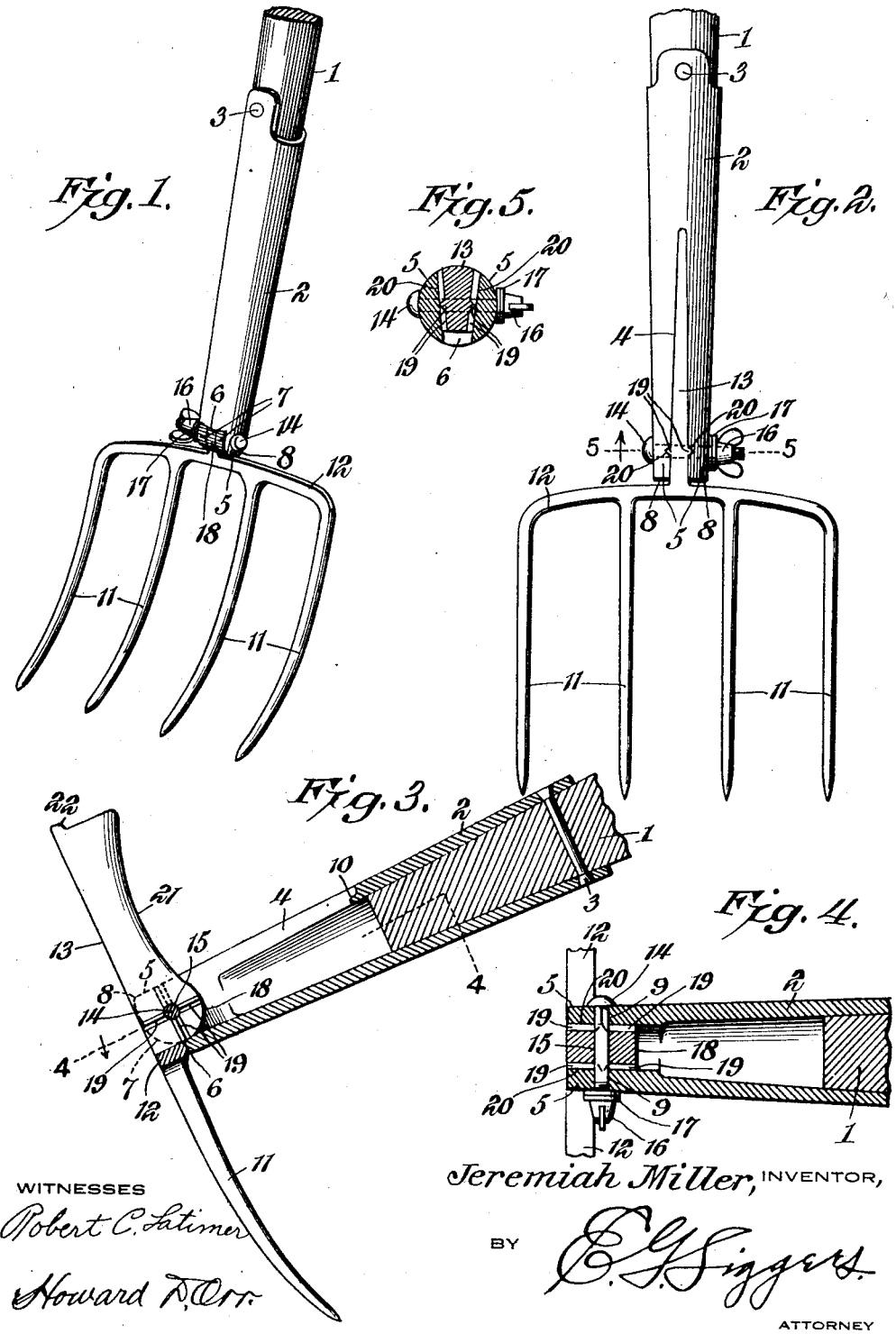

JEREMIAH MILLER, OF OTTAWA, WEST VIRGINIA.

COMBINED FORK, RAKE, AND KNIFE.

1,337,939.   Specification of Letters Patent.   Patented Apr. 20, 1920.

Application filed October 14, 1919. Serial No. 330,532.

*To all whom it may concern:*

Be it known that I, JEREMIAH MILLER, a citizen of the United States, residing at Ottawa, in the county of Boone and State of West Virginia, have invented a new and useful Combined Fork, Rake, and Knife, of which the following is a specification.

This invention relates to garden implements and the object is to provide a combination implement so constructed as to be readily convertible into a pitch-fork, or into a rake or cultivating tool, and having means, when in the latter position, for cutting brush or for weeding purposes, which means may be readily brought into active position by simply turning the device over in the hands of the operator.

Another object is to provide means for housing the brush or weed-cutting means when the device is manipulated to form a pitch-fork, so that the former may not interfere with the action of the latter.

A further object is to construct a device for performing the above operations which is simply constructed, and which may be easily operated to bring the several tools into position, as desired, and to hold the same in such position without the aid of springs or other securing means which may become easily broken or deranged.

The invention is designed as an improvement upon the device shown and described in the Patent #1,022,962, issued to me April 9, 1912, which shows in combination the same kind of tool as in the present application, the improvements consisting primarily in the means for holding the device in its several adjusted positions.

A full and complete understanding of the invention may be obtained from a consideration of the following detailed description, taken in connection with the accompanying drawing forming a part of this specification; it being understood that while the drawing shows a practical form of the invention, the latter is not confined to strict conformity therewith, but may be changed or modified, so long as such changes or modifications mark no material departure from the salient features of the invention, as specifically pointed out in the appended claim.

In the drawing, in which like reference characters designate corresponding parts throughout the several figures:—

Figure 1 is a perspective view of the improved implement arranged as a pitchfork, only a portion of the handle being shown;

Fig. 2 is a rear elevation of the same, taken from the side opposite to that shown in Fig. 1;

Fig. 3 is a longitudinal section thereof, the device being shown adjusted to comprise a rake and cutting device;

Fig. 4 is a detail horizontal sectional view taken on the line 4—4 of Fig. 3 and looking in the direction of the arrow;

Fig. 5 is a detail sectional view taken on the line 5—5 of Fig. 2, and looking in the direction of the arrow.

Referring to the drawing, 1 indicates an ordinary wooden handle such as is commonly used in garden tools and adapted at its lower end to fit a hollow, tapered, metallic ferrule 2, and to be secured thereto as by a bolt or rivet 3.

The hollow ferrule 2 is provided in its tubular wall with a longitudinally disposed slot 4, extending from the end of the ferrule to a point substantially midway the length thereof, the side walls of the said slot being tapered toward its closed end, as clearly illustrated in Fig. 2 of the drawing. The slot 4 extends through only one wall of the ferrule 2, the opposite wall being imperforate, as shown in Fig. 3, and the terminal portion of the ferrule, upon opposite sides of the slot 4, are formed into extending ears 5, 5, the imperforate wall stopping short of the end of the ears 5, 5, to form a shoulder 6, and the said ears being provided with a rounded portion 7, 7, adjacent to the shoulder 6, the opposite sides of the ears being provided with square corners 8, 8, at the sides thereof, adjacent to the slot 4.

The ears 5, 5, are further provided with alined openings 9, 9, located concentrically with the rounded portion 7, 7, of the same, and that terminal of the slot 4 located intermediate of the ferrule 2 is cut away to provide a lug 10 located at the inner face of the ferrule and extending toward the ears 5, 5.

An adjustable rake, fork and cutter member is adapted to be mounted for manipulation between the ears 5, 5 and consists of an ordinary pitch-fork construction having the usual tines 11 joined by the bridging member 12, and provided with a centrally located shank member 13 extending oppositely to the tines 11 in the usual manner. The shank 13 is tapered along one of its edges to correspond with the tapered formation of the slot 4, into which it is adapted to be seated when swung into position therein upon the pivot bolt 14, the latter being adapted to traverse the perforations 9, 9, in the ears 5, 5, and also a suitable registering perforation 15, provided in the shank adjacent to its point of juncture with the bridge member 12.

One of the perforations 9, 9, formed in the ears 5, 5 is squared to receive the corresponding end of the pivot bolt 14 to prevent the latter from turning in the ears 5, 5 and an ordinary thumb-nut 16 with interposed washers 17 are employed to bind the pivoted member in its adjusted position.

The shank 13 is somewhat widened transversely of the bridge 12 and is provided with a rounded portion 18 formed concentrically to the perforation 15, and is provided with a plurality of radially disposed ribs 19 formed integrally therewith and extending from the said perforation 15 outwardly to the edge of the rounded portion 18 thereof and to the tapered back edge of the shank 13. These ribs 19 are preferably angular in cross section, as shown in the drawing, and are adapted to snap into corresponding recesses 20 formed in the inner sides of the ears 5, 5, to position the adjustable fork member either in longitudinal alinement with the handle member to constitute a pitch-fork, as shown in Figs. 1 and 2, or to position the same at right angles to the handle in order to adapt the device as a rake or cultivating tool.

When the device is adjusted as a fork, the shank 13 fits the slot 4 with the outer edge of the shank lying flush with the edges of said slot, while the opposite edge of the shank is formed into a cutting edge 21 which may have a rounded contour, as shown in Fig. 3, for the purpose of facilitating its operation with brush, weeds or the like, when it is desired to cut the same. The end of the shank 13 is also provided with a projecting lug 22 which is adapted to rest upon the lug 10, when the said shank is folded into its position within the slot 4, when the device is adapted as a pitch-fork.

From the foregoing it will be seen that a simple, strong and durable combination device has been provided which may be readily adjusted to comprise a pitch-fork, or a rake or cultivating tool and that, when in the latter adjustment, the same may be readily reversed to bring the said shank in position for cutting or weeding purposes. When the thumb-nut 16 is released, the adjustable member may be swung into either position, when the several ribs 19 will spring or snap into the corresponding recesses 20 to properly position the same. The thumb-nut 16 may again be tightened to bind the same rigidly at its adjustment.

What is claimed is:—

A combination garden tool comprising a ferrule, a handle fitting in the ferrule, spaced apertured ears projecting from the ferrule at the end opposite the handle, said ferrule having a longitudinally tapered slot in one wall between the ears, and extending inwardly therefrom, the opposite wall being imperforate, said imperforate wall terminating short of the outer end of the ferrule to form a shoulder, a pivoted rake and fork member mounted between the ears and adapted to abut in one position against said shoulder, said member having a tapered shank provided with a bolt aperture registering with the apertures in the ears and an enlarged rounded portion partially surrounding the said aperture, ribs formed on each side of said rounded portion and radiating from the aperture therein, the said ears having radially disposed recesses adapted to receive said ribs to hold the pivoted rake and fork member in adjusted position, and a pivot bolt passing through the alined apertures and having a nut for clamping the same.

In testimony that I claim the foregoing as my own, I have hereto affixed my signature in the presence of two witnesses.

JEREMIAH MILLER.

Witnesses:
  LELAND S. BALL,
  LOVENIA S. BALL.